(12) United States Patent
Yang

(10) Patent No.: US 6,371,545 B1
(45) Date of Patent: Apr. 16, 2002

(54) SEAT-MOUNTING STRUCTURE FOR AUTOMOBILE

(75) Inventor: Wan Soo Yang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/666,600

(22) Filed: Sep. 20, 2000

(30) Foreign Application Priority Data

Dec. 31, 1999 (KR) .............................................. 99-67690

(51) Int. Cl.⁷ .................................................. B60N 2/00
(52) U.S. Cl. .......................................... 296/63; 296/204
(58) Field of Search ................................. 296/188, 193, 296/197, 203.01, 204, 205, 29, 30, 63, 66, 68.1

(56) References Cited

U.S. PATENT DOCUMENTS

| | | | | |
|---|---|---|---|---|
| 4,402,545 A | * | 9/1983 | Utsunomiya et al. | ........ 296/204 |
| 5,127,704 A | * | 7/1992 | Komatsu | ..................... 296/204 |
| 5,954,467 A | * | 9/1999 | Paisley et al. | ............. 296/30 X |
| 6,007,145 A | * | 12/1999 | Tezuka | ........................ 296/204 |
| 6,045,174 A | * | 4/2000 | Brancaleone et al. | ......... 296/63 |
| 6,129,412 A | * | 10/2000 | Tanuma | ...................... 296/204 |

* cited by examiner

Primary Examiner—Joseph D. Pape
Assistant Examiner—Jason Morrow
(74) Attorney, Agent, or Firm—Birch, Stewart, Kolasch & Birch, LLP

(57) ABSTRACT

The present invention relates to a seat-mounting structure for an automobile and more particularly, to the seat-mounting structure for an automobile equipped with extra reinforcing mounting bracket on the cross section of a side member and a cross member to provide improved supporting strength of a seat and thus ensure the safety of passengers in case of an accident by dispersing a large load to the seat to both side member and cross member.

6 Claims, 2 Drawing Sheets

SEAT-MOUNTING STRUCTURE FOR AUTOMOBILE

BACKGROUND OF THE INVENTION

The present invention relates to a seat-mounting structure for an automobile and more particularly to the seat-mounting structure of an automobile equipped with extra reinforcing mounting bracket on the cross section of a side member and a cross member to provide improved supporting strength by evenly distributing a large load to both side member and cross member.

Generally, a seat of an automobile is mounted on the cross section of a side member and a cross member.

However, a seat anchor test of conventional seat-mounting structure provides unsatisfactory safety results because a large load to a seat is not evenly distributed to the side member and the cross member and is localized on one of members. Therefore, it is not sufficient to ensure the safety of passengers due to the lack of supporting strength in case of accidents.

SUMMARY OF THE INVENTION

With these problems in mind, therefore, a primary object of the present invention is to provide a seat-mounting structure for an automobile having improved supporting strength of a seat and thus ensure the safety of passengers by arranging a reinforcing mounting bracket on the cross section of a side member and a cross member, enable to evenly distribute a large load to both side member and cross member.

Figure 1:
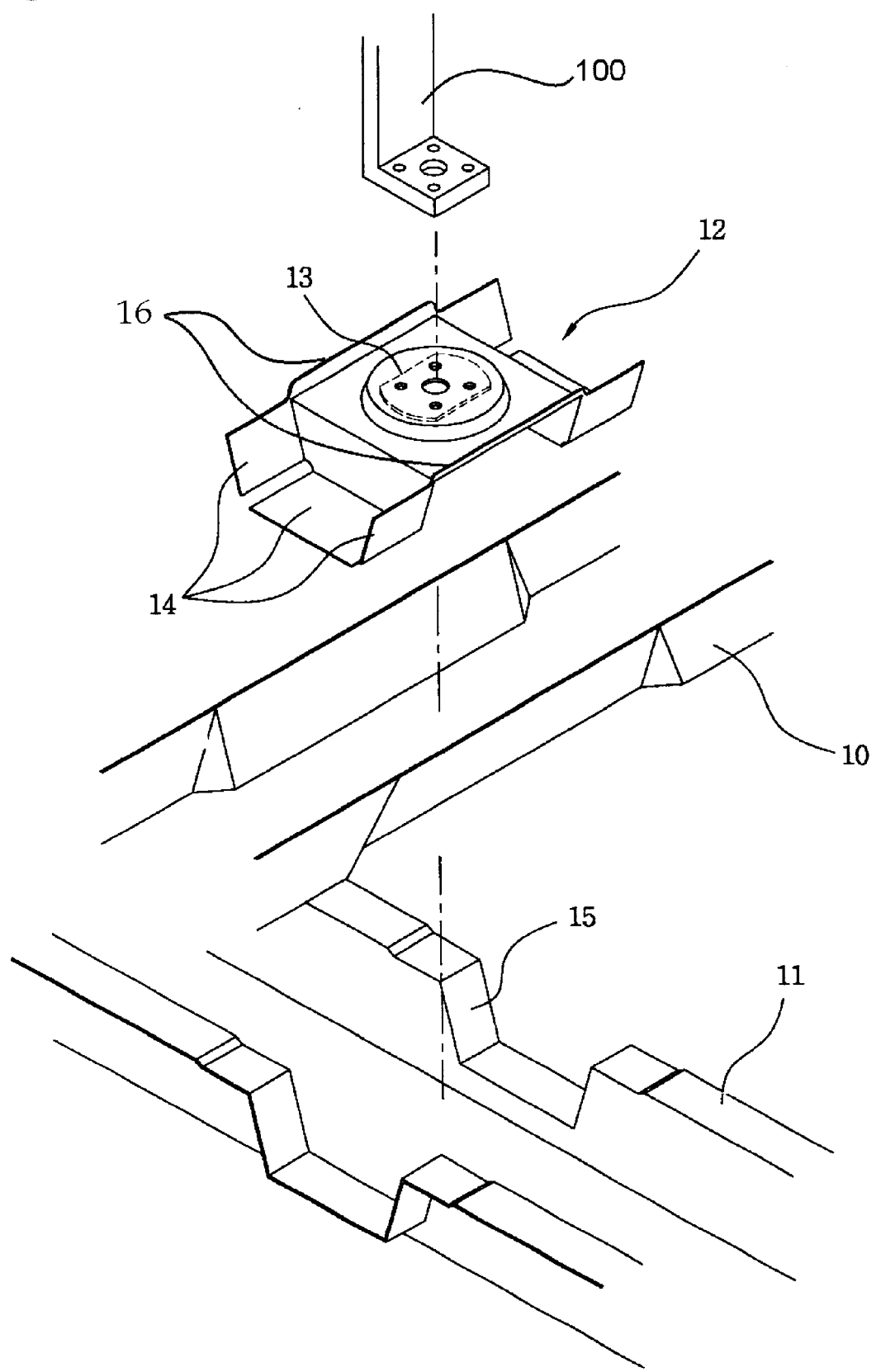
FIG. 1 is an exploded view showing a seat-mounting structure for an automobile according to the present invention.

| 10: a side member | 11: a cross member |
| 12: a reinforcing mounting bracket | 13: a T-nut |
| 14: a flange | 15: a secured section |
| 100: seat bracket | |

DETAILED DESCRIPTION OF THE PREFERRED EMBODIMENTS

The seat-mounting structure for an automobile of the present invention will be described in detail hereunder with reference to the attached drawings.

The present invention relates to a seat-mounting structure for an automobile, wherein a seat is mounted on the cross section of a side member 10 and a cross member 11, characterized in that a reinforcing mounting bracket 12 before installing a seat is disposed on the cross section of said side member 11 and said cross member 10.

In particular, said reinforcing mounting bracket 12 has a C-shape, comprising a T-nut 13 in upper part for fixing a seat bracket 100 and a flange 14 having separate three wings.

Furthermore, the flange 14 of said reinforcing mounting bracket 12 has three wings to weld into bottom and both side portions of the cross section of said side member 10 and said cross member 11.

Figure 2:
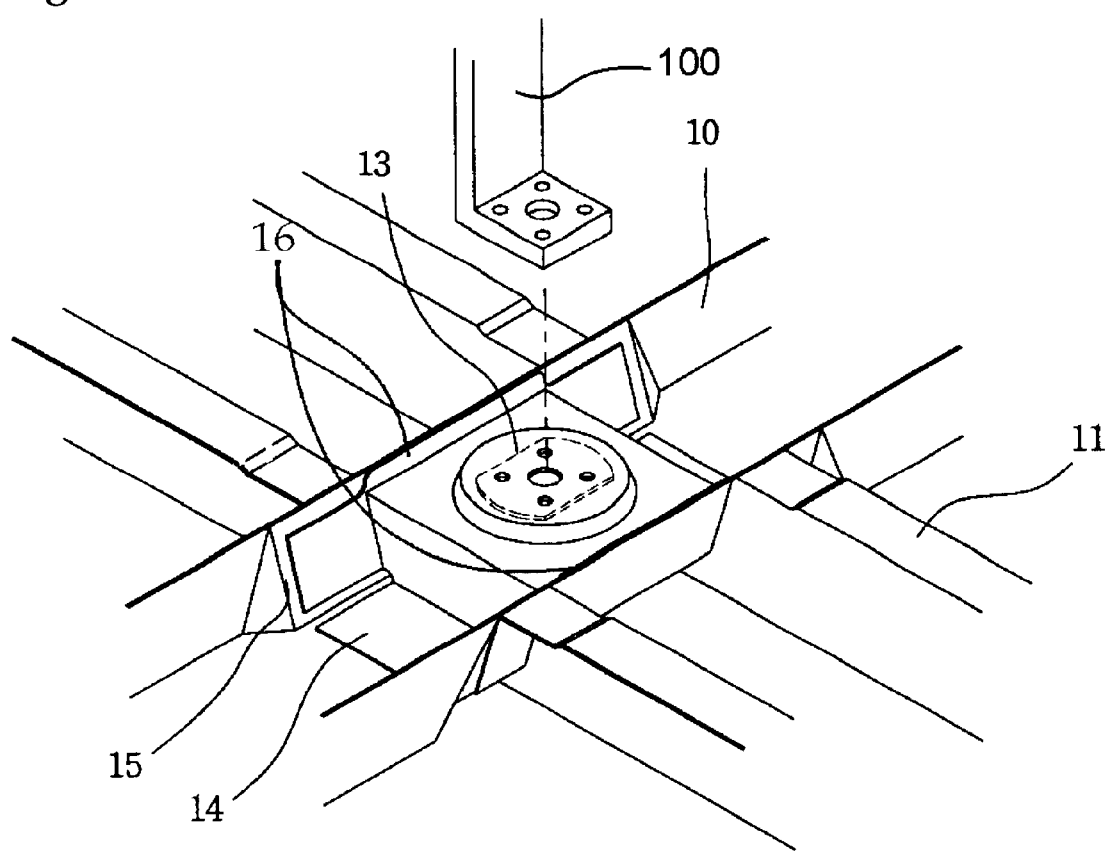
FIG. 2 is a perspective view of as seat-mounting structure assembled according to the present invention.

FIG. 1 is an exploded view showing a seat-mounting structure for an automobile according to the present invention and FIG. 2 is a perspective view of an assembled seat-mounting structure.

Said side member 10 in the longitudinal direction of the vehicle is fixed by welding into U-shaped secured section 15 formed in said cross member 11 in the transverse direction of the vehicle.

After assembling the side member 10 and the cross member 11, the reinforcing mounting bracket 12 is then inserted into the cross section of the side member 10 and the cross member 11, and secured.

In particular, said reinforcing mounting bracket 12 having a C-shape, consists of a T-nut 13 in upper part for fixing a bracket 100 and a flange 14 having separate three wings.

Accordingly, said reinforcing mounting bracket 12 can be secured on the cross section of the side member 10 and the cross member 11 by welding the separate three wings of the flange 14.

Furthermore, the reinforcing mounting bracket 12 is firmly fixed by welding the flange 14 in upper edge portion of the reinforcing mounting bracket 12 with inner side of the side member 10.

As a result, the present invention provides a seat-mounting structure for an automobile having improved supporting strength for a seat and thus ensures the safety of passengers by providing a reinforcing mounting bracket at the intersection of a side member and the cross member to enable a large load to be evenly distributed to both the side member and the cross member through each wing of the flange 14 on the same.

What is claimed is:

1. A seat-mounting assembly for mounting of an automobile seat comprising a longitudinal supporting member, a lateral supporting member, and a seat mounting bracket, said longitudinal and lateral supporting members intersecting and being configurated so as to be in interlocking relationship at the point of intersection, and said seat mounting bracket being affixed to both said longitudinal and lateral supporting members at said point of intersection.

2. A seat-mounting assembly according to claim 1, wherein said seat mounting bracket comprises flanges which are attached to said longitudinal and lateral supporting members.

3. A seat-mounting assembly according to claim 1, wherein said seat mounting bracket is U-shaped.

4. A seat-mounting assembly according to claim 1, wherein said seat mounting bracket is welded to said longitudinal and lateral supporting members.

5. A seat-mounting assembly according to claim 1, wherein one of said longitudinal or lateral supporting members includes a U-shaped portion within which said other intersecting supporting member is fixed.

6. A seat-mounting assembly according to claim 2, wherein said seat mounting bracket comprises horizontally-oriented flanges which are affixed to one of said longitudinal or lateral supporting members and vertically-oriented flanges which are attached to said other supporting member.

* * * * *